United States Patent [19]
Fujiwara et al.

[11] Patent Number: 5,608,474
[45] Date of Patent: Mar. 4, 1997

[54] IMAGE DISPLAYING DEVICE

[75] Inventors: Yoshio Fujiwara; Etsuro Saito, both of Kanagawa, Japan

[73] Assignee: Sony Corporation, Tokyo, Japan

[21] Appl. No.: 600,899

[22] Filed: Feb. 13, 1996

[30]　　　Foreign Application Priority Data

Feb. 14, 1995　[JP]　Japan ................................ 7-050404
Apr. 14, 1995　[JP]　Japan ................................ 7-113702

[51] Int. Cl.⁶ .............................. G03B 21/46; G03B 1/00
[52] U.S. Cl. .......................................... 352/160; 352/166
[58] Field of Search ..................................... 352/166, 160

[56]　　　　　References Cited

U.S. PATENT DOCUMENTS 5,082,357　1/1992　Haas et al. ............................. 352/160

Primary Examiner—Michael L. Gellner
Assistant Examiner—Matthew Miller
Attorney, Agent, or Firm—Limbach & Limbach L.L.P.

[57]　　　　　ABSTRACT

An image displaying device which is able to prevent the occurrence of fluctuations in the picture which is projected on the screen, even if some positional fluctuations have occurred in the movie film. The optical axis correcting means is provided on the optical path of the transmitted light which has been obtained from the light source via the movie film, and also the detecting means is provided for detecting the quantity of the displacement from the base position at the time the movie film has stopped on the basis of the travel-synchronizing holes which have been formed in the longitudinal direction of the movie film, whereby the optical axis correcting means is able to change the angle of the optical axis of the transmitted light, according to the result of detection obtained from the detecting means, on the basis of drive controlling by the driving means. As a result the optical axis can be corrected. Thus, an image displaying device can be realized which is able to prevent the occurrence of fluctuations in the picture which is projected on the screen, even if some positional fluctuations have occurred in the movie film.

6 Claims, 11 Drawing Sheets

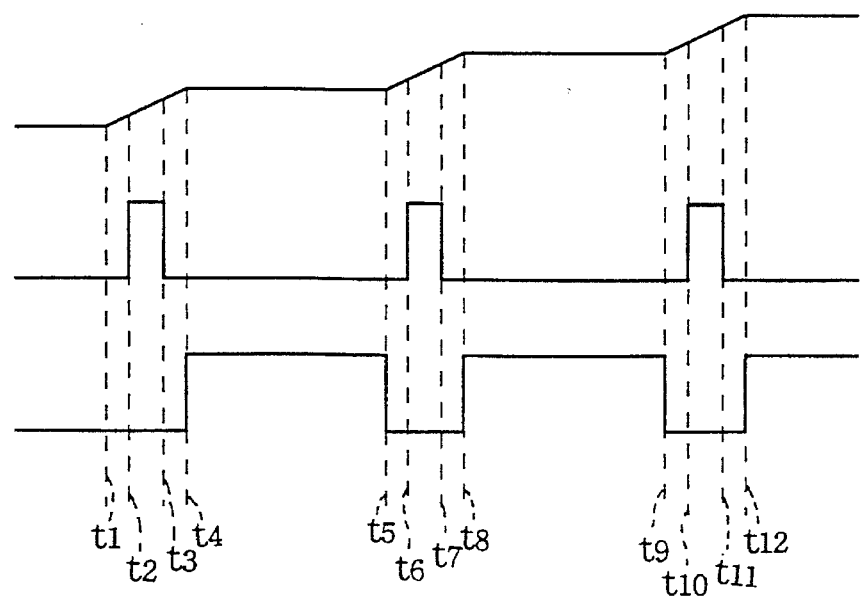
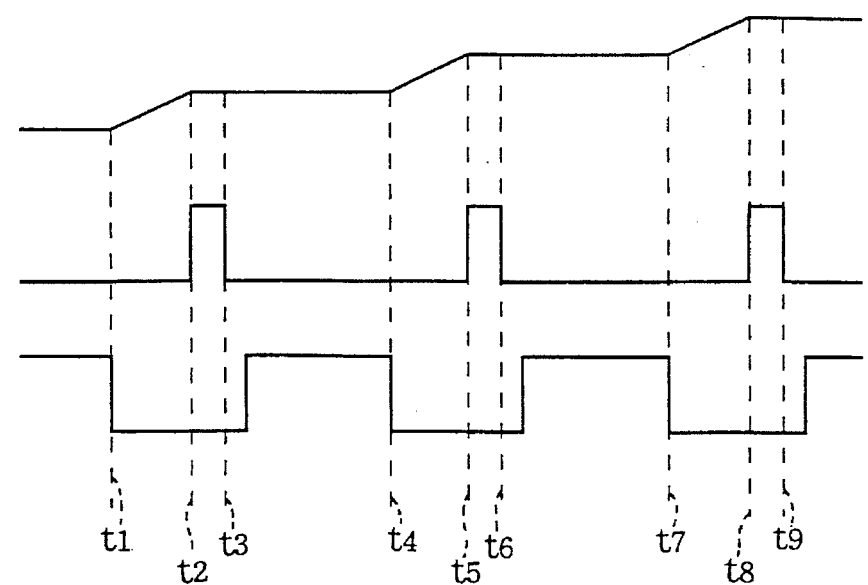

IMAGE DISPLAYING DEVICE

BACKGROUND OF THE INVENTION

1. Field of the Invention

The present invention relates to an image displaying device, and is applicable to an image displaying device for projecting an image which has been recorded on a movie film onto the screen.

2. Description of the Related Art

Heretofore, as shown in FIG. 1, in a 35 mm movie film 1 which has been used in a movie theater, a feeding hole for travel synchronization (hereinafter, this is referred to as a perforation) 2 is provided sequentially, for each stated interval, on both edge portions, in width direction, of the movie film 1; the image information and the sound information which is composed of an analog signal are optically recorded respectively in the corresponding recording regions 4 and 5 of the inside part placed between these two perforation strings (hereinafter, these are referred to as the first and the second perforation strings respectively) 3A, 3B.

To transport the movie film 1, as shown in FIG. 2, the image reproducing block 10 in the image displaying device (not shown) sends out sequentially the movie film 1 which is supplied from the feeding reel via the sprocket 11 to a winding reel, via a gate portion 12 and a sprocket for an intermittent feeding 13 (hereinafter, this is referred to as an intermittent-feed sprocket).

The gate portion 12 is constituted such that both edge portions, in the width direction, of the movie film 1 are put between a pressure plate 12A and a picture gate 12B, and during travel of the movie film 1, the pressure plate 12A is pushed toward the picture gate 12B so that the movie film 1 is held between them.

In reproduction mode, the intermittent-feed sprocket 13 sequentially rotates by a stated angle at a stated timing, whereby the movie film 1 is intermittently fed so that each image recording region 4 of the movie film 1 (FIG. 1) sequentially pauses at the gate portion 12 for an instant (for example, at the rate of 24 times per second).

A light beam for projection (hereinafter, this is referred to as a projecting light beam) L1 is emitted from a light source 14 which has been placed on the left side of the picture gate 12B in the image reproducing block 10, and irradiated to the movie film 1 via a window hole (not shown) which has been provided on the surface, which is opposite to the movie film 1, of the picture gate 12B.

In the image reproducing block 10, the transmitted light which is the projecting light beam L1 which has been passed through each image recording region 4 of the movie film 1 is projected on the screen 16, via the window hole (not shown) which has been provided on the surface, which is opposite to the movie film 1, of the pressure plate 12A, and also via a projecting lens portion 15, so that the image is projected on the screen 16.

By the way, in practice, in the gate portion 12 of the image reproducing block 10, the regions lying outside, in the width direction, of perforation strings 3A, 3B of the movie film 1 and the regions lying between respective perforations 2 are pushed toward the picture gate 12B by the pressure plate 12A, so that the positions of movie film 1 does not fluctuate longitudinally.

When the movie film 1 is intermittently fed by the intermittent-feed sprocket 13, the position can be thereby stabilized at which the movie film 1 is paused for an instant in the gate portion 12 with the rotating motion of the intermittent-feed sprocket 13. As a result fluctuations will not occur in the image which is projected on the screen 16.

However, when the movie film 1 is intermittently fed, relative friction is apt to be generated between the first and the second perforation strings 3A, 3B and the pressure plate 12A and/or the picture gate 12B. For this reason there has been a problem in that many scratches are apt to be generated in the first and the second perforation strings 3A, 3B during the movie film 1 travels. Besides, there has been a problem that owing to the relationship with the status of the surface of the movie film 1, at the time of intermittent feeding, it becomes difficult to maintain the pause position in the gate portion 12 of the movie film 1 in a stable way.

Because it is feared that some fluctuations occur in the image which is projected on the screen 16 in the case where positional fluctuations occur in the width direction of the movie film 1 as well, a guide (not shown) which is so constituted as to hold the movie film 1 in the width direction is provided in the gate portion 12, in order that the movie film 1 does not fluctuate in its width direction. However, because of a gap which occurs between the movie film 1 and the guide, the position of the movie film 1 occasionally fluctuates in its width direction. As a result, it is feared that some fluctuations occur in the picture which is projected on the screen 16.

SUMMARY OF THE INVENTION

In view of the foregoing, an object of the present invention is to provide an image displaying device which is able to prevent the occurrance of fluctuations in the picture which is projected on the screen, even if some positional fluctuations have occurred in the movie film.

The foregoing object and other objects of the present invention have been achieved by the provision of an image displaying device wherein a movie film is intermittently stopped in a manner synchronized with rotation of a sprocket by means of travel-synchronizing holes which have been formed longitudinally with respect to the movie film, and a light from the light source is projected on the stated region of the movie film at the stopped base position, and the light which has been passed through the movie film is displayed on a screen, the image displaying device comprising: detecting means for detecting the displacement from the base position of the time the movie film has stopped, on the basis of the travel-synchronizing holes; optical axis correcting means for correcting the optical axis of the transmitted light, according to the result of the detection; and driving means for driving the optical axis correcting means.

Because the optical axis correcting means has been provided on the optical path of the transmitted light which has been obtained from the light source via the movie film, and also the detecting means has been provided for detecting the quantity of the displacement from the base position at the time the movie film has stopped on the basis of the travel-synchronizing holes which have been formed in the longitudinal direction of the movie film, the optical axis correcting means is able to change the angle of the optical axis of the transmitted light, according to the result of detection obtained from the detecting means, on the basis of drive controlling by the driving means. As a result the optical axis can be corrected. Thus, it is able to prevent the occurrance of fluctuations in the picture which is projected on the screen, even if some positional fluctuations have occurred in the movie film.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 9A to 9C are signal waveform charts explaining a motion state in the image reproducing block according to the first embodiment;

FIGS. 14A to 14C are signal waveform charts explaining a motion state in the image reproducing block according to the other embodiment.

DETAILED DESCRIPTION OF THE EMBODIMENT

Figure 1:
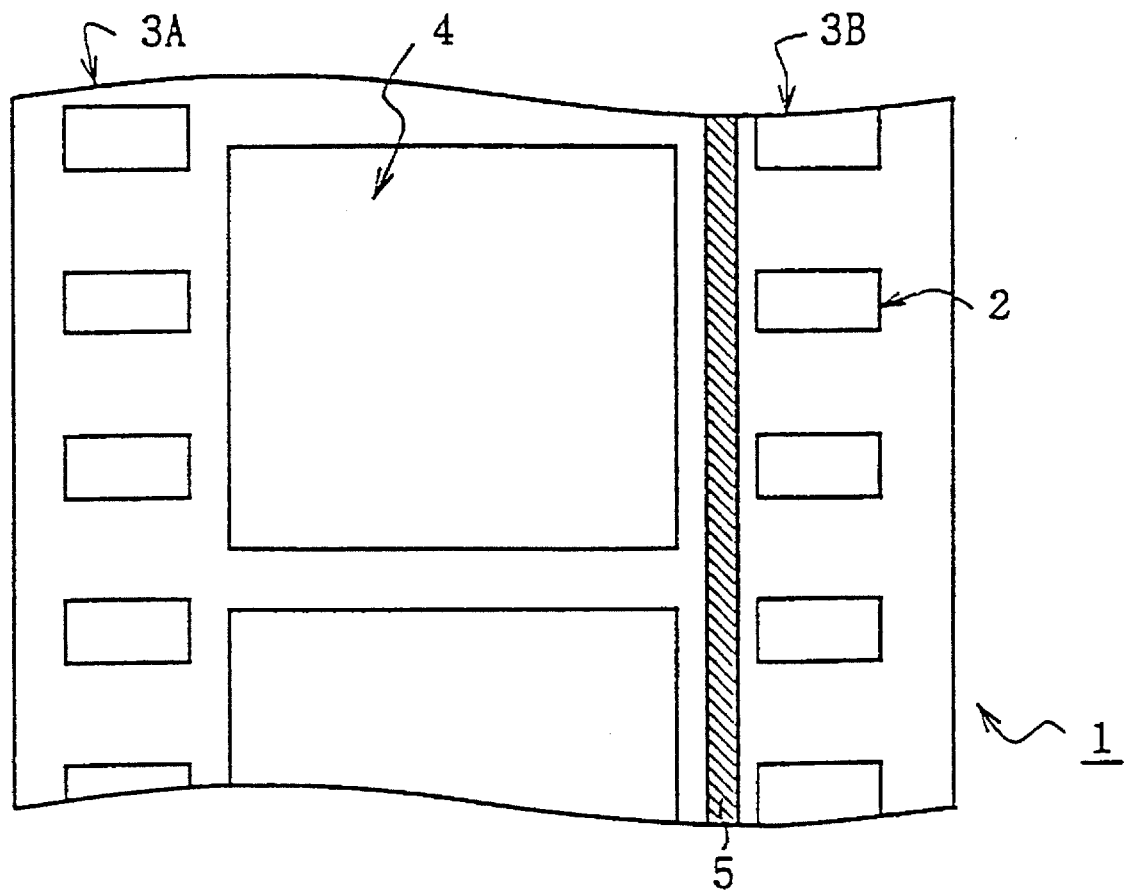
FIG. 1 is a plane view showing a movie film.
Figure 2:
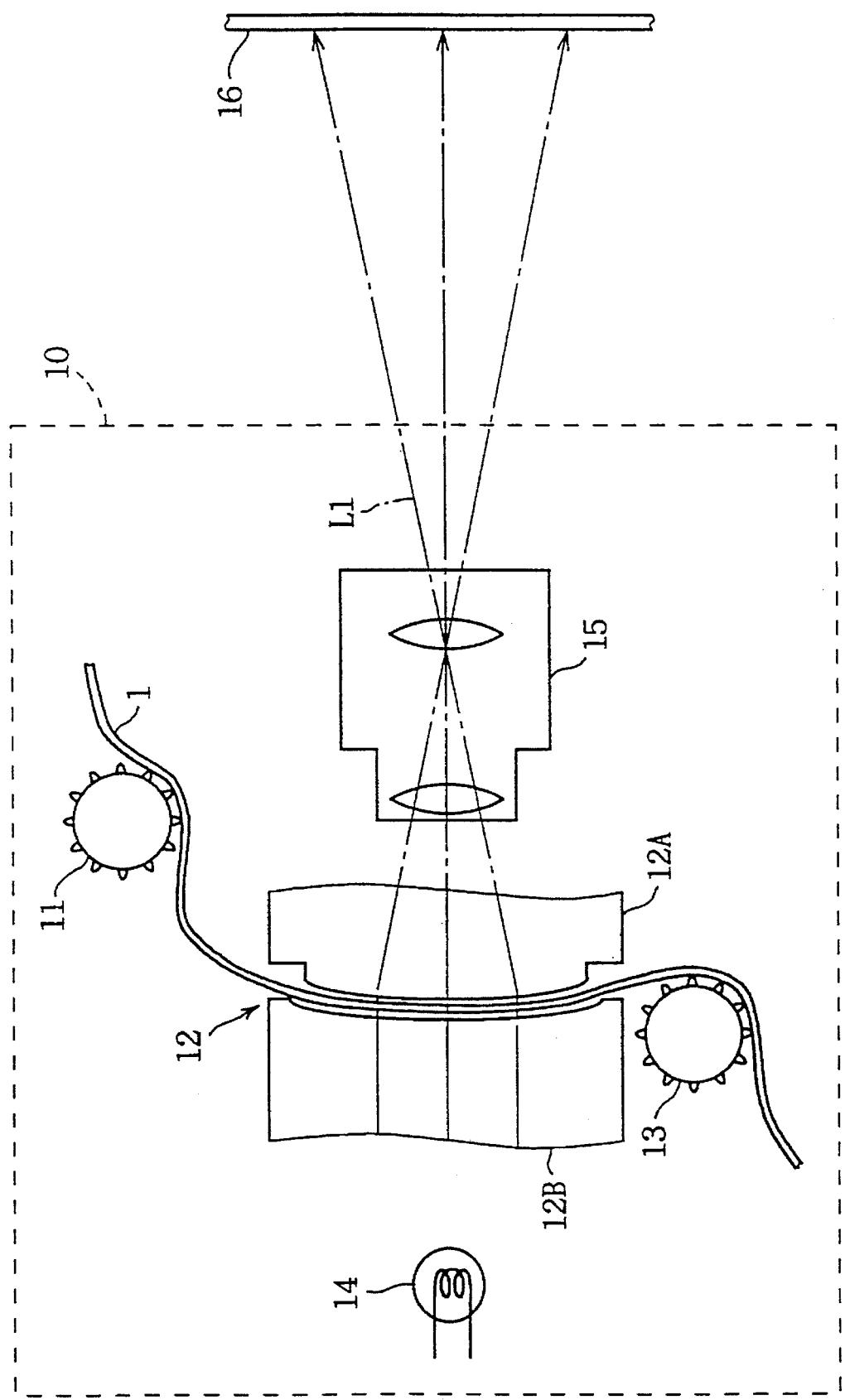
FIG. 2 is a block diagram showing a conventional image reproducing block.

Preferred embodiments of the present invention will be described with reference to the accompanying drawings:
(1) The First Embodiment In FIG. 3 which has the same reference numerals as FIG. 2 on their corresponding portions, an image reproducing block 20 which is contained in an image display device (not shown), an optical axis correcting unit 22 is provided in a projection lens unit 21 in addition to the conventional image reproducing unit 10, and a film sensor 23 is provided in a gate portion 12 as well.

Figure 4:
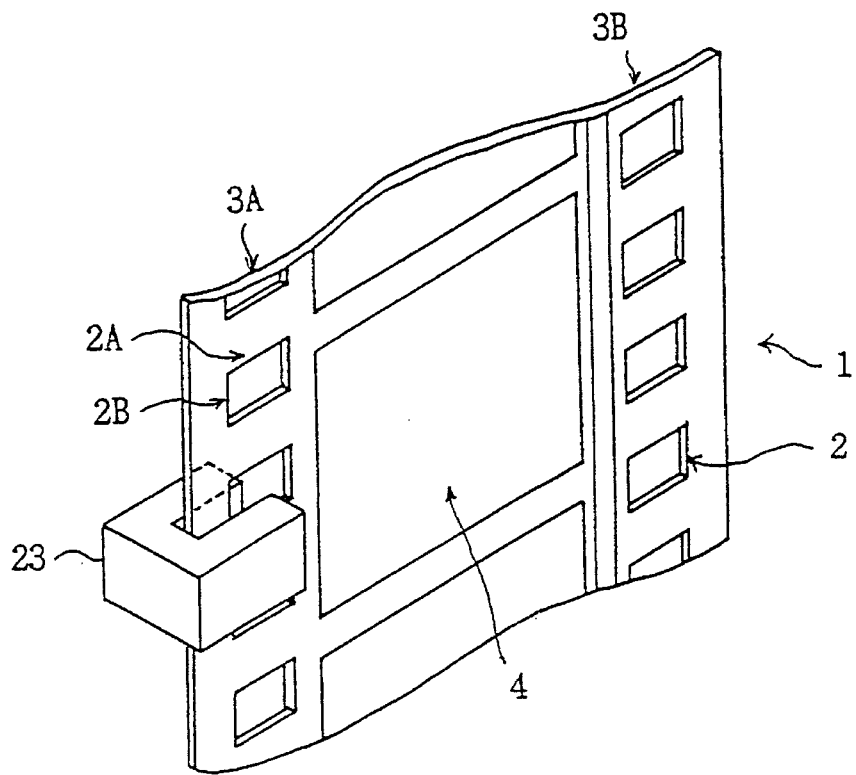
FIG. 4 is a perspective view showing the aspect of detection of the film sensor.
Figure 5:
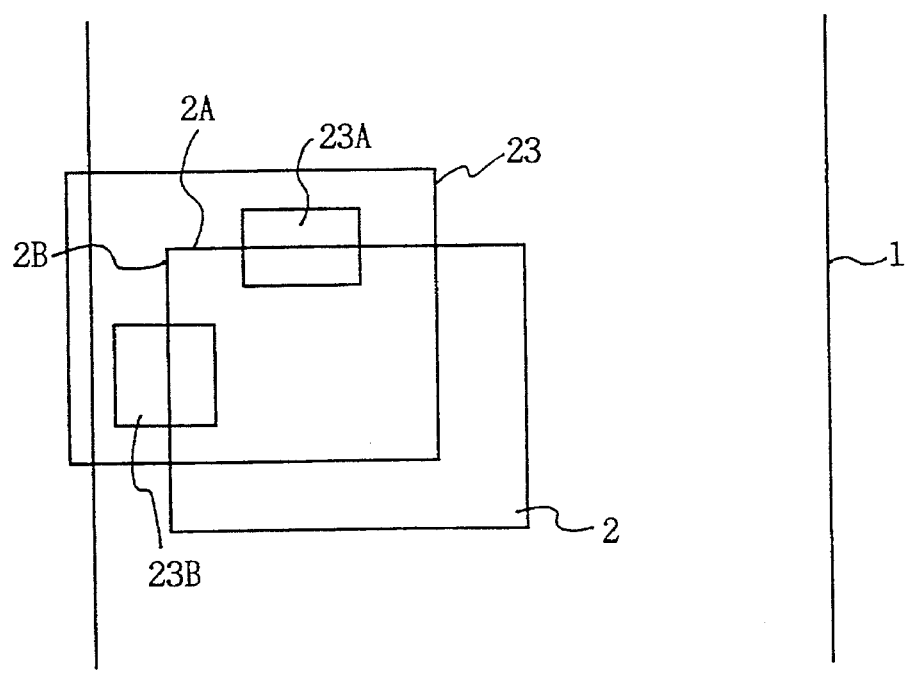
FIG. 5 is a schematic diagram showing the structure of the film sensor.
Figure 6A:
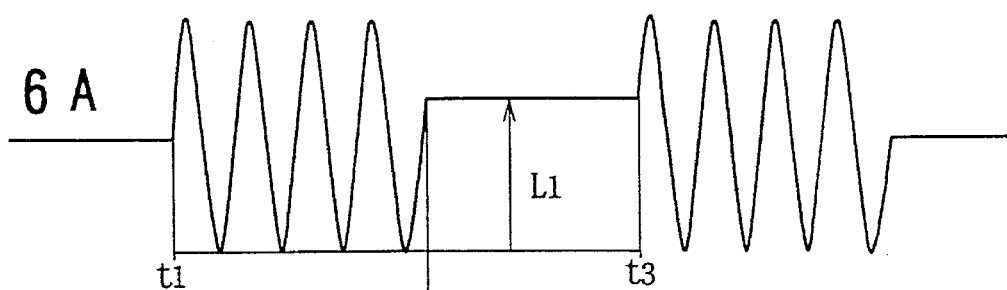
FIGS. 6A to 6C are signal waveform charts showing the output signal of the film sensor.
Figure 6B:
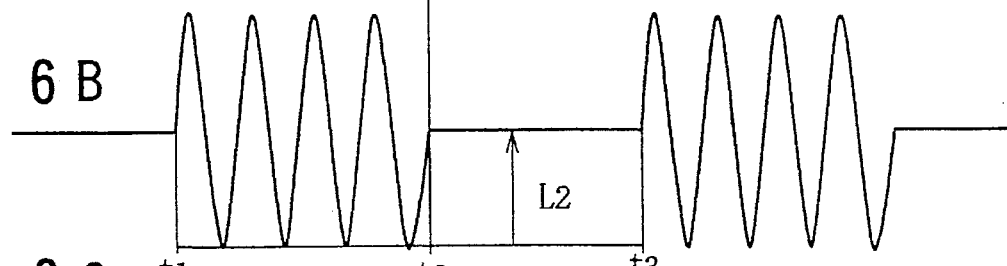
Figure 6C:
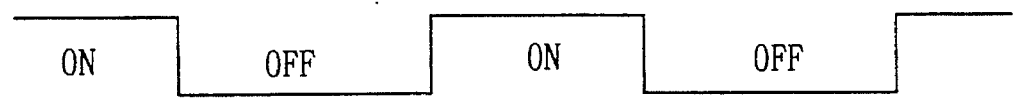

As shown in FIG. 4, the film sensor 23 is formed into U-shape, and a perforation string 3A of a movie film 1 is inserted there, so that displacements from the corresponding stated base positions (hereinafter, this is referred to as positional-fluctuation quantities) can be detected with respect to an edge portion 2A in the longitudinal direction and an edge portion 2B in the width direction of each perforation 2. Now, the structure and motion of this film sensor 23 will be described in detail. In FIG. 5, the film sensor 23, the longitudinal direction detecting sensor portion 23A which is provided within the film sensor 23, and the width direction detecting sensor portion 23B are shown. Also in FIG. 5, an end portion in the longitudinal direction 2A, an end portion in the width direction, of the perforation 2, and the position relationship between the respective sensor portions 23A and 23B are shown. Note that, this position relationship is in the stopped state of the movie film 1. At this time, the output signal of the sensor portion 23A has a level in a normal state as shown in FIG. 6A. Also, the output signal of the sensor portion 23B is in a normal state as shown in FIG. 6B. Now, if the movie film 1 begins to move from the beginning toward the end at the time point $t_1$, the perforation 2 passes the sensor portions 23A and 23B moving downward. As a result, with respect to the output of the sensor portions 23A and 23B, a sine waveform having almost four cycles is obtained from the time point $t_1$ till the time point $t_2$, as shown in FIGS. 6A to 6C, because four perforations are allotted to one frame of the image portion 4 of the movie film 1. At the time when the movie film 1 is stopped at the time point $t_2$, level signals of L1 and L2 are generated according to the stop position. The level of L1 changes variously according to the stop position of the film in the longitudinal direction, and also the level of L2 changes variously according to the stop position in the width direction.

Referring again to FIG. 3, the optical axis correcting unit 22 is so arranged as to be able to change the angle of the optical axis of the projection light beam L1 on the basis of the quantity of positional fluctuation of the movie film 1 which has been detected by the film sensor 23. A projection shutter 50 is provided in the gate portion 12, and adapted to and close in a manner linked with the intermittent-feed motion of the movie film 1, and also adapted to open only when the movie film 1 is in a paused state.

When the movie film 1 is fed intermittently, the film sensor 23 provides the signal S1A which shows the quantity of a positional fluctuation in the longitudinal direction of the movie film 1 (which is shown by L1 in FIG. 6A) and also the signal S1B which shows the quantity of a positional fluctuation in the width direction of the movie film 1 (which is shown by L2 in FIG. 6B) to amplifiers 25 and 26 respectively, which then sends them to adders 27 and 28. On the other hand, the output S1 of the film sensor 23 (which is signals shown in FIGS. 6A and 6B) is sent to a control unit 24 which supplies signals where the signals S1A and S1B are in a normal state (FIG. 6C), S2 and S3 to the amplifiers 25 and 26, respectively. According to these signals S2 and S3, the amplifiers 25 and 26 only operate in the term where both signals S2 and S3 are in the ON state to amplify the signals of S1A and S1B and send them to the adders 27 and 28, respectively. Hereinafter, those signals S2 and S3 are referred to as gate signals.

The adder 27 provides the longitudinal direction detecting signal S1A to an amplifier 29 as the synchronized output signal S4, in the term where the gate signal S2 is the ON state. S1A is amplified and output as the synchronized output signal S5 through the amplifier 29 and then sent to a driving unit 30. Similarly, the adder 28 synchronizes the width direction detecting signal S1B in the term where the gate signal S3 is the ON state, and then sends it via an amplifier 31 to a driving unit 32 as the synchronized output signal S5.

The driving unit 30 changes the angle of the optical axis of the projection light beam L1 at the optical axis correcting unit 22 on the basis of the synchronized output signal S4, and sends the information of the changed angle to a position sensor 33. Similarly, the driving unit 32 changes the angle of the optical axis of the projection light beam L1 at the optical axis correcting unit 22 on the basis of the synchronized output signal S5, and sends the information of the changed angle to a position sensor 35.

The position sensor 33 detects the quantity of the optical axis correction on the basis of the angle information which is obtained from the drive unit 30, and then sends it to the adder 27 via an amplifier 34 as the optical axis correction detecting signal S6. The adder 27 subtracts the optical axis correction detecting signal S6 from the longitudinal direction detecting signal S1A which has been synchronized with the gate signal S2, and outputs the difference between the signal level of the positional fluctuation in the longitudinal direction of the movie film 1 and the quantity of optical axis correction which is according to the positional fluctuation as the synchronized output signal S4. In this way, the driving unit 30 changes the angle of the optical axis until the optical axis has been corrected.

The position sensor 35 detects the quantity of optical axis correction on the basis of the angle information which is obtained from the drive unit 32, and then sends it to the adder 28 via an amplifier 36 as the optical axis correction detecting signal S7. The adder 28 subtracts the optical axis correction detecting signal S7 from the width direction detecting signal S1B which has been synchronized with the gate signal S3, and outputs the difference between the signal level of the positional fluctuation in the width direction of the movie film 1 and the quantity of optical axis correction which is according to the positional fluctuation as the synchronized output signal S5. In this way, the driving unit 32 changes the angle of the optical axis until the optical axis has been corrected.

Figure 7:
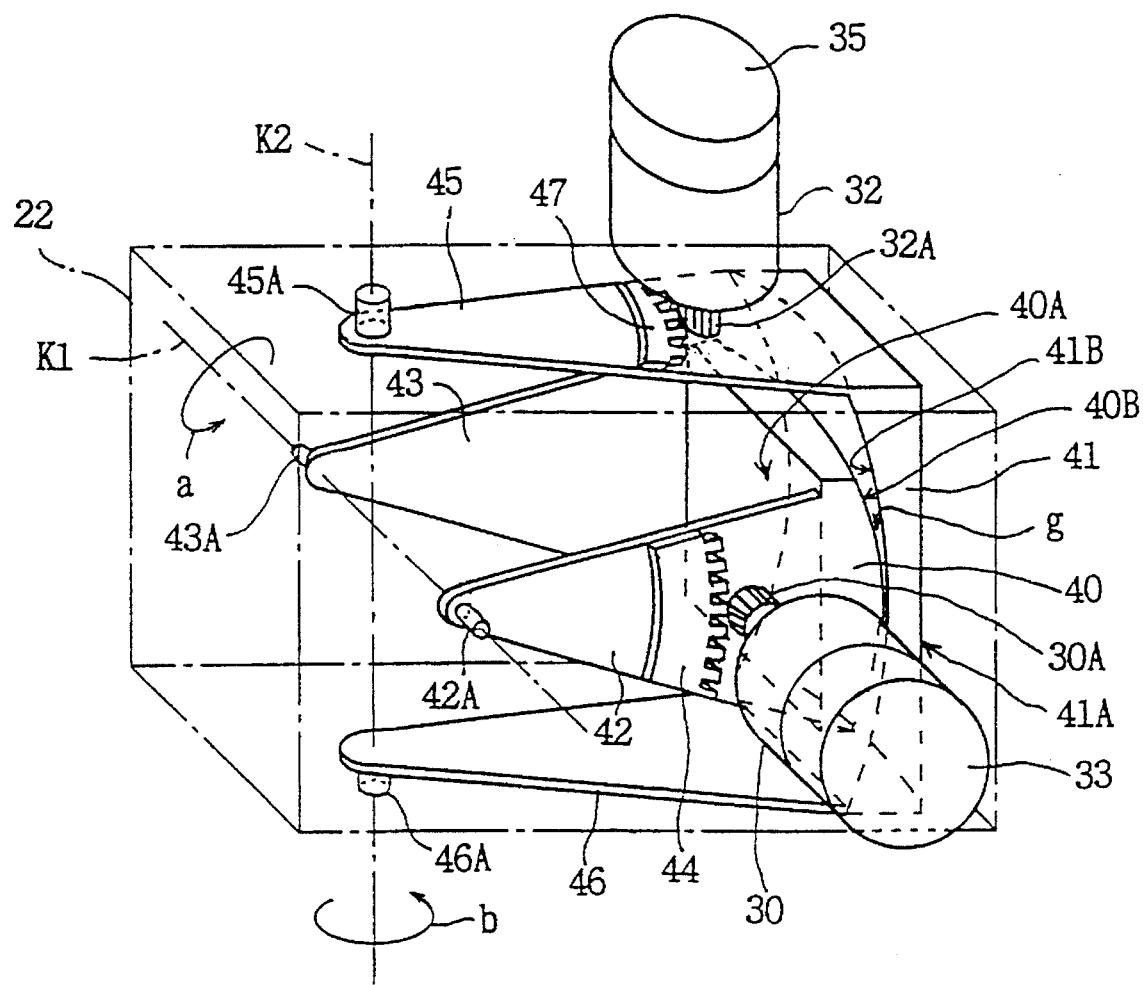
FIG. 7 is a perspective view showing the optical axis correcting unit according to the first embodiment.

Now, as shown in FIG. 7, the optical axis correcting unit 22 has a lens which is composed of a plane surface and a convex surface (hereinafter, this is referred to as a plane convex lens) 40 and also a lens which is composed of a plane surface and a concave surface (hereinafter, this is referred to as a plane concave lens) 41. Both the plane convex lens 40 and the plane concave lens 41 are made of glass materials which have the identical refractive index.

Sector arms 42 and 43 which have a coaxial center axis K1 are attached respectively to one side edge and the other side edge of the plane convex lens 40, and the plane convex lens 40 can be moved, around pins 42A and 43A which have been placed on the center axis K1 of the arms 42 and 43, toward the direction shown by the arrow "a" or toward the reverse direction. Besides, the arm 42 is provided with a rack 44, which is mated with a pinion gear 30A which has been fixed on the output shaft of the motor 30.

Sector arms 45 and 46 which have a coaxial center axis K2 are attached respectively to the upper edge and the bottom edge of the plane concave lens 41, and the plane concave lens 41 can be moved, around pins 45A and 46A which have been placed on the center axis K2 of the arms 45 and 46, toward the direction shown by the arrow "b" or toward the reverse direction. Besides, the arm 45 is provided with a rack 47, which is mated with a pinion gear 32A which has been fixed on the output shaft of the motor 32.

The motor 30 is provided with a position sensor 33, so that the quantity of movement of the plane convex lens 40 can be detected on the basis of the rotated angle of the pinion gear 30A. In this way, the quantity of correction of the optical axis of the projection light beam L1 can be detected. The motor 32 is provided with a position sensor 35, so that the quantity of movement of the plane concave lens 41 can be detected on the basis of the rotated angle of the pinion gear 32A. In this way, the quantity of correction of the optical axis of the projection light beam L1 can be detected.

The center axes K1 and K2 intersect orthogonally with each other on the single plane surface, and, when the convex surface 40B and the concave surface 41B have been combined, form the center of curvature of the convex surface 40B and the concave surface 41B. A gap "g" is provided between the convex surface 40B and the concave surface 41B, and an identity of the curvature of the convex surface 40B and the curvature of the concave surface 41B can be maintained substantially, and generating of friction between the convex surface 40B and the concave surface 41B can be prevented.

Figure 8:
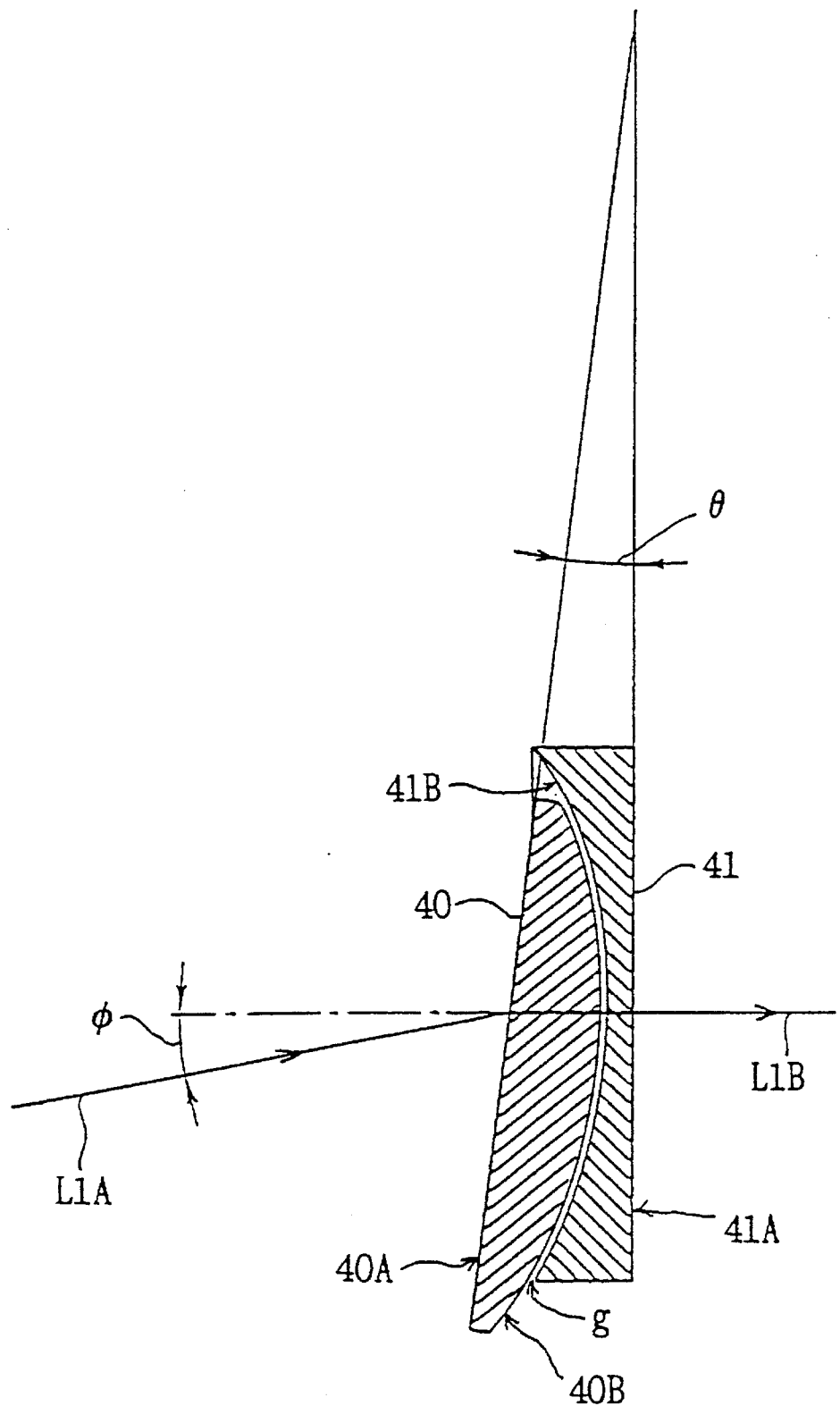
FIG. 8 is a cross-sectional view explaining correction of the optical axis by the optical axis correcting unit of FIG. 7.

In FIG. 8, which shows the cross section of the optical axis correcting unit 22 shown in FIG. 7 taken by the plane surface which is formed by the optical axis (not shown) of the projection light beam L1 and the center axis K1 (or the center axis K2), at first, when the plane convex lens 40 and the plane concave lens 41 are in such a positional relationship that the plane surface 40A and the plane surface 41A are parallel, the optical axis L1A of the plane convex lens 40 side and the optical axis L1B of the plane concave lens 41 side are coincident.

Next, in the case where the plane convex lens 40 and the plane concave lens 41 have been relatively displaced so as to move along the curved surface of each other so that the angle formed by the plane surface 40A and the plane surface 41A becomes θ, the angle of the optical axis L1A of the plane convex lens 40 side is bent by φ with respect to the optical axis L1B of the plane concave lens 41.

Suppose "n" is the refractive index of the glass material of the plane convex lens 40 and the plane concave lens 41, the following equation:

$$\phi = \sin^{-1}(n \times \sin\theta) \tag{1}$$

is obtained between θ and φ.

In the above constitution, FIGS. 9A to 9C show the motion timing of the intermittent-feed sprocket 13, the optical axis correction unit 22 and the projection shutter 50 of the image reproducing block 20, respectively. First, when the movie film 1 is fed intermittently by the intermittent-feed sprocket 13, at the time point $t_1$, the movie film 1 goes into the travel starting state (FIG. 9A) and the projection shutter 50 goes into the closed state (FIG. 9C).

In this state, during the time from the time point $t_2$ till the time point $t_3$, the optical axis correction unit 22 performs correction of the optical axis of the projection light beam L1 (FIG. 9B) on the basis of the position information of the perforation 2 of the movie film 1, and then, at the time point $t_4$, the movie film 1 goes into the travel stop state (FIG. 9A) and also the projection shutter 50 goes into the open state (FIG. 9C).

Subsequently, during the term from the time point $t_5$ till the time point $t_8$ and during the succeeding term from the time point $t_9$ till the time point $t_{12}$, similarly to the foregoing, correction of the optical axis is performed while the movie film 1 is traveling, that is, while the projection shutter 50 is being closed; whereby the projection shutter 50 can be opened for a relatively long term, and fluctuation of the picture can be prevented without generating brightness flicker on the picture which is projected on the screen 16.

According to the above constitution, the optical axis correcting unit 22 is placed within the projection lens unit 21 in the image reproducing block 20, and the angle of the optical axis of the projection light beam L1 is changed on the basis of the quantity of positional fluctuation, in the longitudinal direction and the width direction, of the movie film 1 which has been detected by the film sensor 23, so that the optical axis can be corrected. In this way, fluctuation of the picture which has been projected on the screen 16 can be prevented even if positional fluctuation has occurred on the movie film 1.

(2) The Second Embodiment

Figure 3:
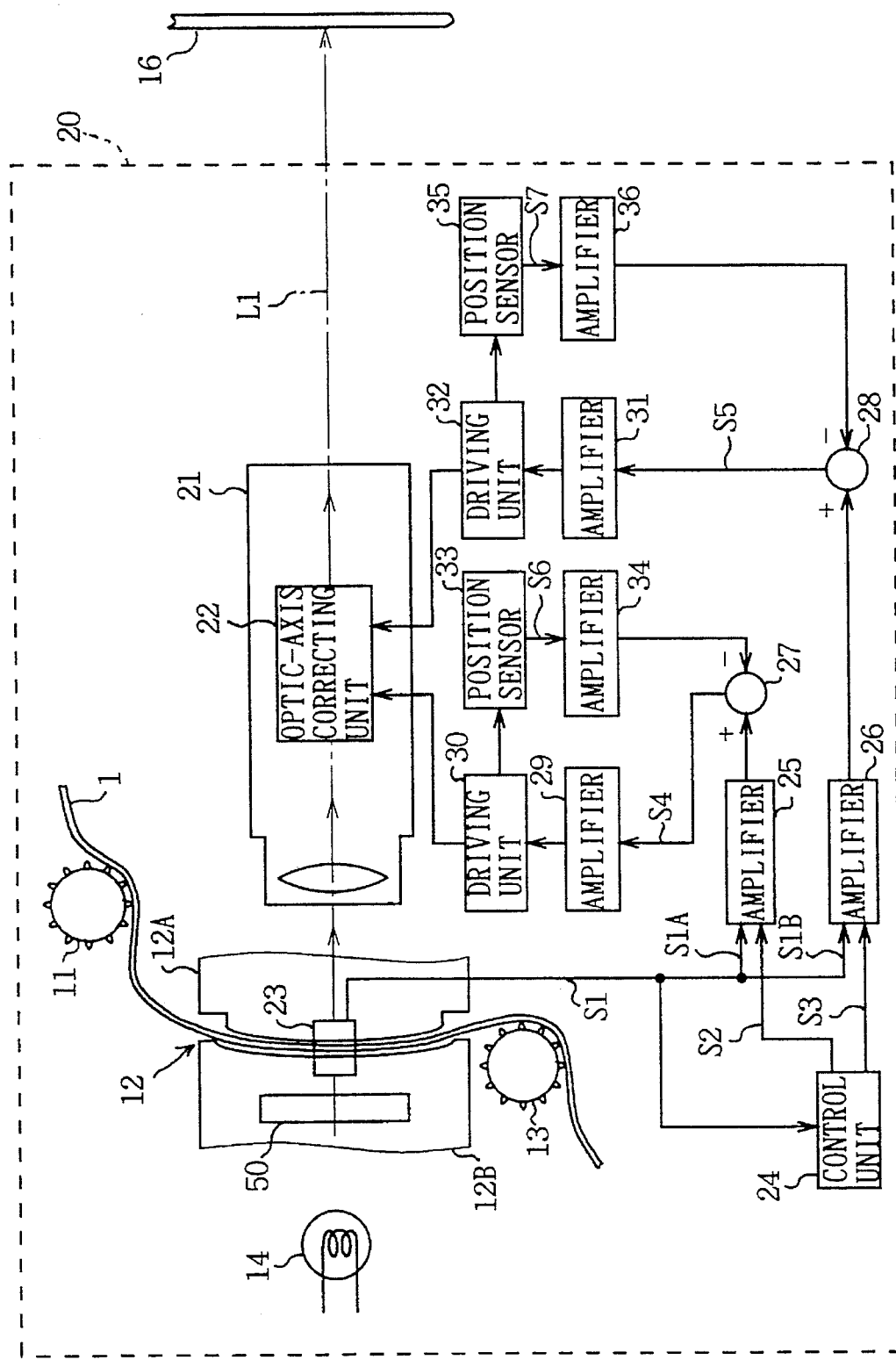
FIG. 3 is a block diagram showing the constitution of the image reproducing block according to the first embodiment.
Figure 10:
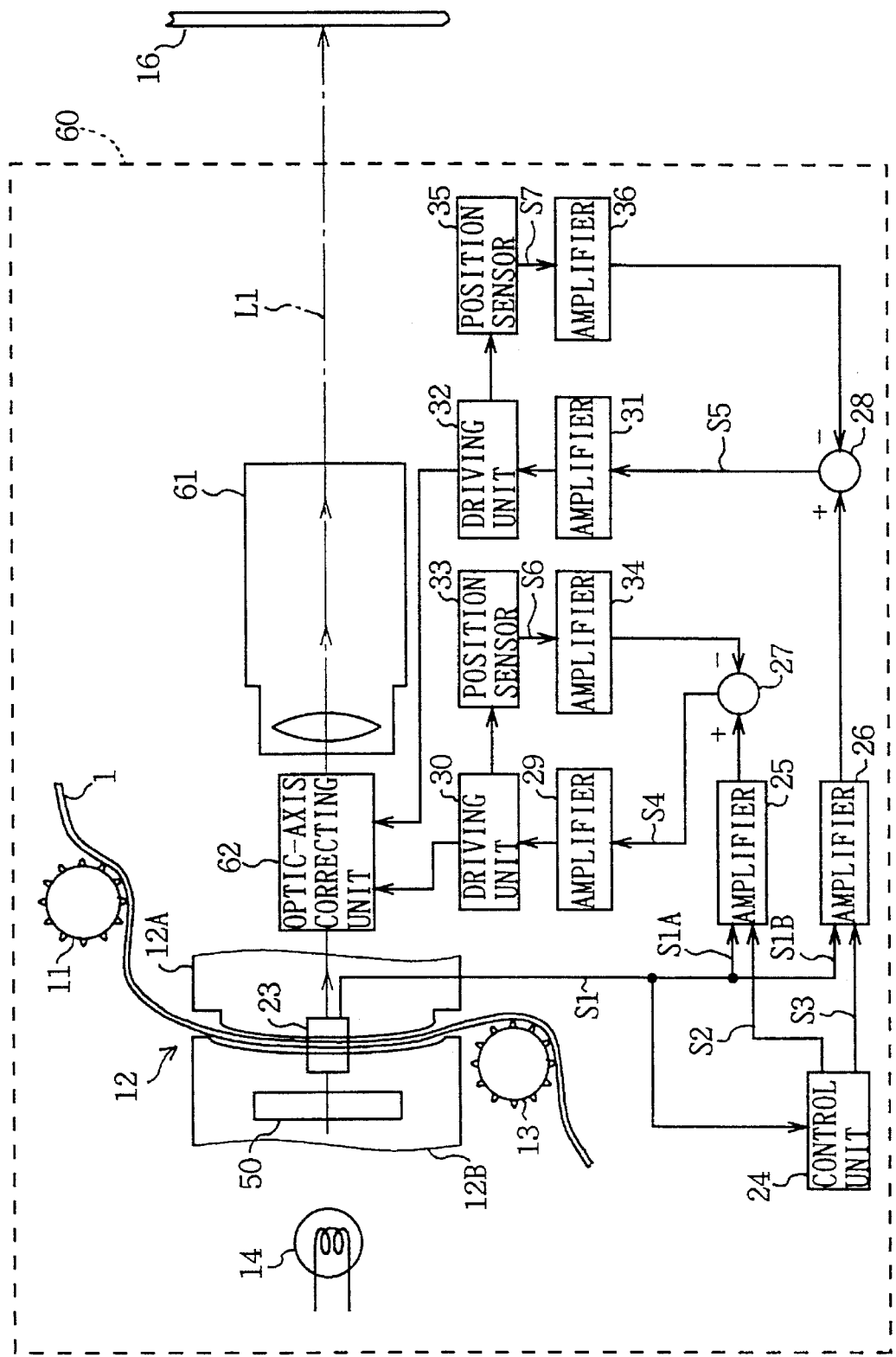
FIG. 10 is a block diagram showing the constitution of the image reproducing block according to the second embodiment.

In FIG. 10 which has the same reference numerals as FIG. 3 on their corresponding portions, an image reproducing block 60 has the similar constitution to the image reproducing block 20, except that the optical axis correcting unit 22 is omitted from the image reproducing block 20 of the first embodiment and an optical axis correcting unit 62 is placed between a projection lens unit 61 and the gate portion 12.

Figure 11:
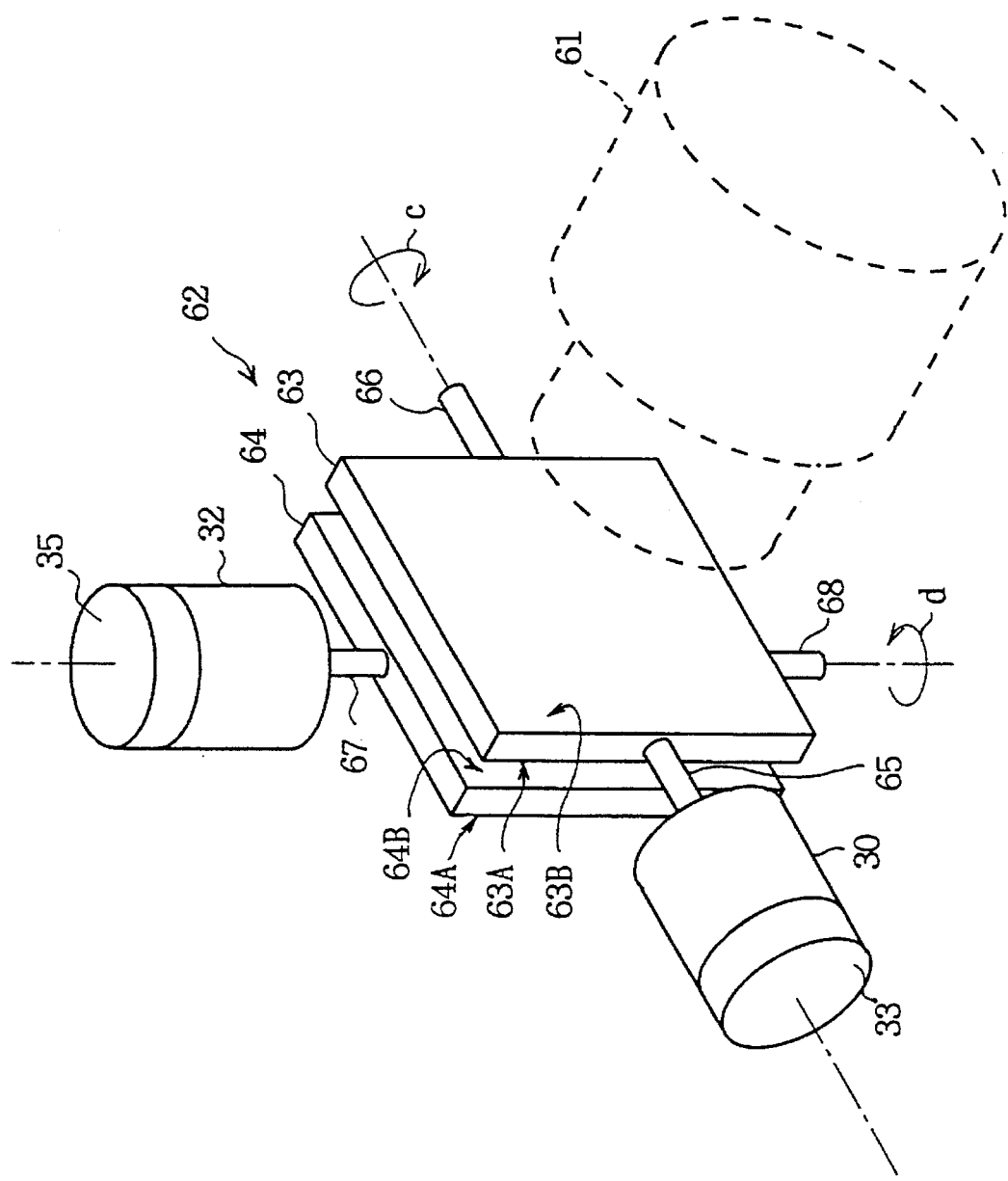
FIG. 11 is a perspective view showing the optical axis correcting unit according to the second embodiment.

The optical axis correcting unit 62 has a first and a second flat plates 63 and 64 as shown in FIG. 11, and both the first and the second flat plates 63 and 64 are made of glass materials which have the identical refractive index.

Shafts 65 and 66, which are coaxial with an output shaft of a motor 30, are attached respectively to one side edge and the other side edge of the first flat plate 63 in an integrated manner, and the first flat plate 63 can be moved round, upon the shafts 65 and 66, toward the direction which is shown by the arrow "c" or toward the reverse direction. The shaft 65 has been coupled to the output shaft of the motor 30.

Shafts 67 and 68, which are coaxial with an output shaft of a motor 32, are attached respectively to one side edge and the other side edge of the second flat plate 64 in an integrated manner, and the second flat plate 64 can be moved round, upon the shafts 67 and 68, toward the direction which is shown by the arrow "d" or toward the reverse direction. The shaft 67 has been coupled to the output shaft of the motor 32.

The output shafts of the motors 30 and 32 have been set to be perpendicular to each other. The motor 30 is provided with a position sensor 33, so that the quantity of movement of the first flat plate 63 can be detected on the basis of the rotated angle of the shaft 65. In this way, the quantity of correction of the optical axis of the projection light beam L1 can be detected. The motor 32 is provided with a position sensor 35, so that the quantity of movement of the second flat plate 64 can be detected on the basis of the rotated angle of the shaft 67. In this way, the quantity of correction of the optical axis of the projection light beam L1 can be detected.

Figure 12:
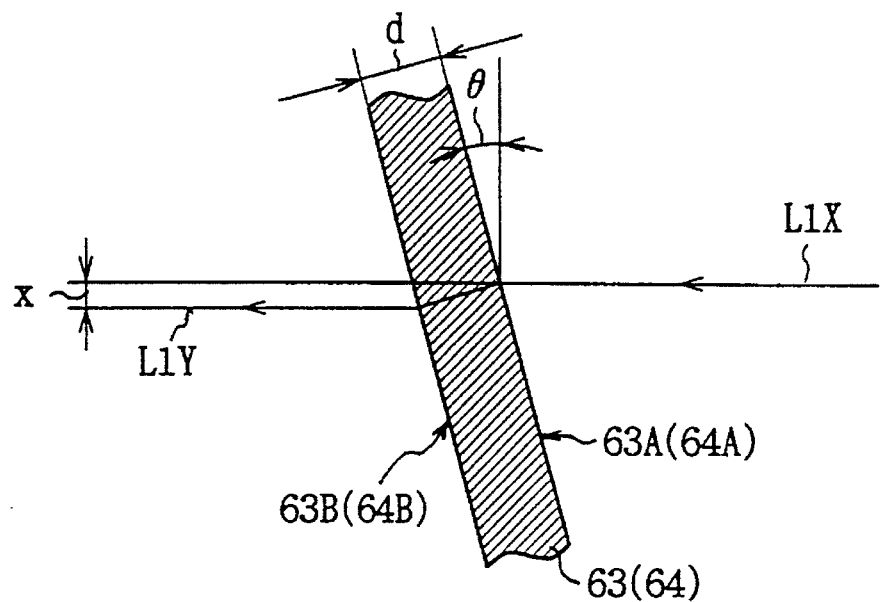
FIG. 12 is a cross-sectional view explaining correction of the optical axis by the optical axis correcting unit of FIG. 11.

The first flat plate 63, out of the optical axis correcting unit 62 shown in FIG. 11, is shown in FIG. 12 as a cross section which has been taken by the plane surface which is formed by the optical axis (not shown) of the projection light beam L1 and the output shaft of the motor 30. In FIG. 12, when the first flat plate 63 is in parallel relationship to the surface which is formed with the output shafts of the motors 30 and 32, the optical axis L1X of the outer plane 63A side and the optical axis L1Y of the inner plane 63B side are coincident.

Next. In the case where the first flat plate 63 has been moved round upon the shafts 65 and 66 toward the direction shown by the arrow "c" or toward the reverse direction, and tilted so that the angle which is formed by the outer plane 63A and the flat plane formed by the output shafts of the motors 30 and 32 becomes θ, the optical axis L1X of the outer plane 63A side is displaced by x. In the direction which is parallel to the output shaft of the motor 32, with respect to the optical axis L1Y of the inner plane 63B side.

The second flat plate 64, out of the optical axis correcting unit 62 shown in FIG. 11, is shown in FIG. 12 in like manner, as a cross section taken by the plane surface which is formed by the optical axis (not shown) of the projection light beam L1 and the output shaft of the motor 32. In FIG. 12, when the second flat plate 64 is in parallel relationship to the surface which is formed with the output shafts of the motors 30 and 32, the optical axis L1X of the outer plane 64A side and the optical axis L1Y of the inner plane 64B side are coincident.

Next. In the case where the second flat plate 64 has been moved round upon the shafts 67 and 68 toward the direction shown by the arrow "d" or toward the reverse direction, and tilted so that the angle which is formed by the outer plane 64A and the flat plane formed by the output shafts of the motors 30 and 32 becomes θ, the optical axis L1X of the outer plane 64A side is displaced by x, in the direction which is parallel to the output shaft of the motor 30, with respect to the optical axis L1Y of the inner plane 64B side.

Figure 13:
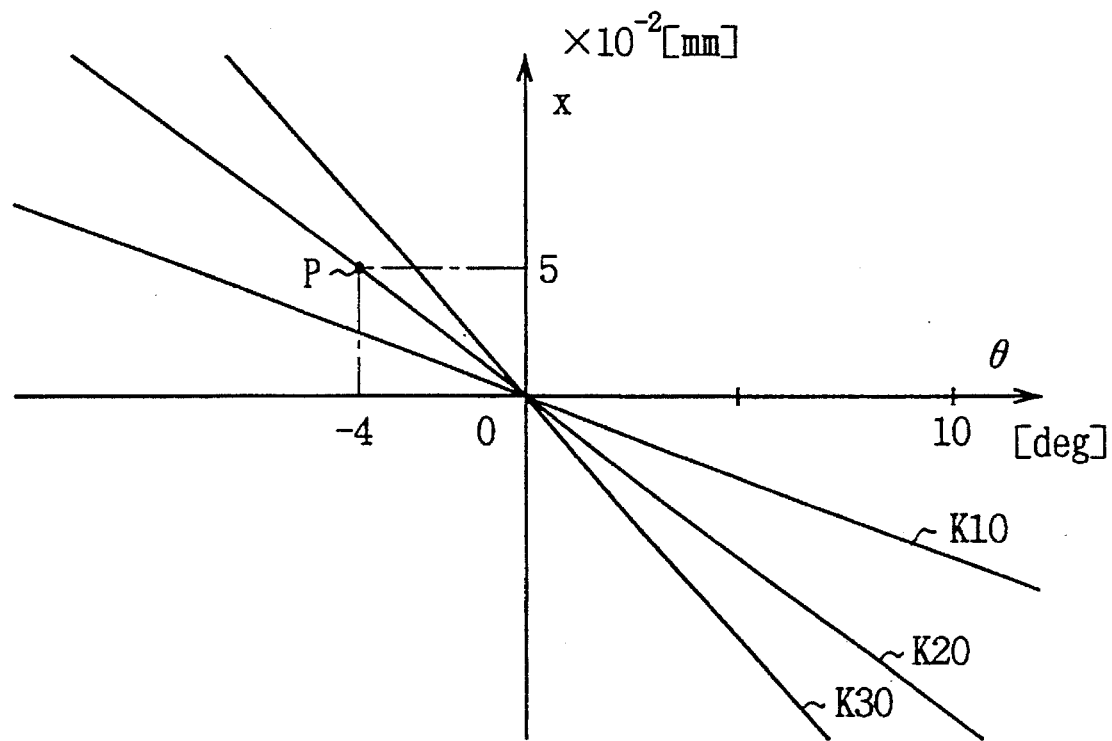
FIG. 13 is a graph representing the relationship between the quantity of parallel displacement and the angle of inclination in optical axis correction of FIG. 12.

Suppose "d" is the thickness of the glass material, and "n" is refractive index, with respective to the first and the second flat plates 63 and 64. The following equation:

$$x = \{d \tan \theta - d \tan (\sin^{-1}(\sin \theta / n))\} \times \tan (\pi/2 - \theta) \quad (2)$$

is obtained between θ and x. The quantity x of parallel displacement is represented as a function of θ, in Equation (2); in the case where the value of θ is small, x and θ are almost in proportional relation and represented by the straight lines K10, K20 and K30 shown in FIG. 13, which are different according to the refractive index n. In this case, the straight line K10 shows the case where d=2, and n=1.2, the straight line K20 shows the case where d=2, and n=1.5, and the straight line K30 shows the case where d=2, and n=2.0. For instance, the point P on the straight line K20 is representing that the optical axis L1X performs parallel displacement by x=0.05 [mm] when θ equals 4°. Thus, as to the function of x and θ, in the case where the value of θ is small, the more the value of n is large, the more the value of x becomes larger.

In the above constitution, the motion timing of the intermittent-feed sprocket 13, the optical axis correcting unit 62, and the projection shutter 50 of the image reproducing block 60 is same as that of the first embodiment shown in FIGS. 9A to 9C. That is, when the movie film 1 is fed intermittently by the intermittent sprocket 13, optical axis correction is performed at the time the movie film 1 is traveling, so that fluctuation of the picture can be prevented without generating flicker on the picture which is projected on the screen 16.

According to the above constitution, the optical axis correcting unit 62 is placed within the projection lens unit 61 in the image reproducing block 61, and the angle of the optical axis of the projection light beam L1 is changed on the basis of the quantity of positional fluctuation, of the longitudinal direction and the width direction, of the movie film 1 which has been detected by the film sensor 23, so that the optical axis can be corrected. In this way fluctuation of the picture which has been projected on the screen 16 can be prevented even if positional fluctuation has occurred on the movie film 1.

Because the combination of the first and the second transparent flat plates 63 and 64 has been used as the optical axis correcting unit 62, the constitution becomes more simple and the mechanism becomes simple in comparison with the combination of two lenses which is composed of the plane convex lens 40 and the plane concave lens 41 shown in the optical axis correcting unit 22 of the first embodiment, so that the entire device can be miniaturized made lightweight. In this way it can be operated at relatively high speed.

(3) Other Embodiments

In the first and the second embodiments, the motion timing of the optical axis correcting operations in the image reproducing units 20 and 60 of the first and the second embodiments has been performed when the movie film 1 is traveling. However, the present invention is not limited to such cases, but the optical axis correcting operation may be performed with the motion timing shown in FIGS. 14A to 14C.

The image reproducing block applied here (not shown) has the same constitution as those of the image reproducing blocks 20 and 60 of the first and the second embodiments, excepting the difference of the mechanism of the projection shutter 50. This projection shutter has been set so that the opened term is comparatively short; in this case, it opens when the stated term has elapsed after stopping of travel of the movie film 1, and closes with starting of travel of the movie film 1.

That is, when the movie film 1 is fed intermittently by the intermittent-feed sprocket 13, at the time point $t_1$, the movie film 1 comes to a travel starting state (FIG. 14A) and the projection shutter comes to a closed state (FIG. 14C). Then, at the time point $t_2$, the movie film 1 comes to a travel stop state (FIG. 14A) and the optical axis correcting unit 22 starts to correct the optical axis of the projection light beam L1 (FIG. 14B) on the basis of the positional information of the perforation 2 of the movie film 1 of the present term. Then, during the term until the time point $t_3$ the optical axis correcting unit 22 performs correction of the optical axis (FIG. 14B), and then, at the time point $t_4$, the projection shutter comes to a open state (FIG. 14C).

Subsequently, during the term from the time point $t_5$ till the time point $t_8$ and during the succeeding term from the time point $t_9$ till the time point $t_{12}$, similarly to the foregoing, correction of the optical axis is performed while traveling of the movie film 1 is stopped; whereby optical axis correction can be performed more accurately in comparison with the cases of the first and the second embodiments. In this way fluctuation of the picture can be prevented without generating brightness flicker on the picture which is projected on the screen 16.

In the first embodiment, the combination of two lenses which is composed of the plane convex lens 40 and the plane concave lens 41 has been utilized as the optical axis correcting unit 22, and in the second embodiment, the combination of the first and the second transparent flat plates 63 and 64 has been utilized as the optical axis correcting unit 62. However, the present invention is not limited to this, but is applicable to the case where two glass plates, between which liquid has been filled so as to form an incorporated prism, are utilized as the optical axis correcting unit (not shown). In this case, the angle of the optical axis can be changed by changing the vertical angle of the prism. As a result the optical axis can be corrected, and in this way the same effect as the aforesaid cases can be obtained.

Further, in the first embodiment, the combination of two lenses which is composed of the plane convex lens 40 and the plane concave lens 41 has been utilized as the optical axis correcting unit 22, and in the second embodiment, the combination of the first and the second transparent flat plates 63 and 64 has been utilized as the optical axis correcting unit 62. However, the present invention is not limited to this, but is applicable to the case where an acousto-optic light modulator is utilized as the optical axis correcting unit (not shown).

An acousto-optic light modular is constituted such a piezoelectric oscillator (transducer)(a thin film made from, for instance, $LiNbO_3$, ZnO, etc.) has been bonded onto an acoustooptic medium (for instance, a $PbMoO_4$ crystal, a $TeO_2$ crystal, etc.), and arranged such that a high-frequency electric signal is inputted from a drive unit via the piezoelectric oscillator. The high-frequency electric signal is converted into an ultrasonic signal by the piezoelectric oscillator, and changes the refractive index of the acousto-optic medium periodically in the acousto-optic medium. As a result, the acousto-optic medium forms a diffraction grating (hereinafter, this is referred to as an ultrasonic diffraction grating).

In this state, the projection light beam L1 which has been irradiated on the wave front of the ultrasonic wave at the Bragg angle is diffracted toward only the direction which makes the same angle as wave front of the ultrasonic wave. Therefore by changing the frequency of the ultrasonic wave, the grating space of the ultrasonic diffraction grating is changed, that is, the Bragg angle is changed, and as a result the angle of optical deflection of the projection light beam L1 can be changed.

Because the optical axis correcting means has been provided on the optical path of the transmitted light which has been obtained from the light source via the movie film, and also the detecting means has been provided for detecting the quantity of the displacement from the base position at the time the movie film has stopped on the basis of the travel-synchronizing holes which have been formed in the longitudinally direction of the movie film, the optical axis correcting means is able to change the angle of the optical axis of the transmitted light, according to the result of detection obtained from the detecting means, on the basis of drive controlling by the driving means. As a result the optical axis can be corrected. Thus, it is able to prevent fluctuations in the picture which is projected on the screen, even if some positional fluctuations have occurred in the movie film.

While there has been described in connection with the preferred embodiments of the invention, it will be obvious to those skilled in the art that various changes and modifications may be made, therefore, to cover in the appended claims all such changes and modifications as fall within the true spirit and scope of the invention.

What is claimed is:

1. An image displaying device wherein a movie film is intermittently stopped in a maimer synchronized with rotation of a sprocket by means of travel-synchronizing holes which have been formed longitudinally with respect to said movie film, and a light from a light source is projected on a stated region of said movie film at a stopped base position, and the light which has been passed through said movie film is displayed on a green, said image displaying device comprising:

detecting means for detecting the displacement from the base position at the time said movie film has stopped, on the basis of said travel-synchronizing holes;

optical axis correcting means for correcting the optical axis-of said transmitted light, according to the result of said detection; and driving means for driving said optical axis correcting means.

2. The image displaying device according to claim 1, wherein said optical axis correcting means is comprised of a combination of a first lens which has a plane surface and a convex surface and a second lens which has a plane surface and a concave surface;

the curvatures of said convex surface and said concave surface arc substantially identical, and said first lens and said second lens are displaced along said convex surface and said concave surface relative to each other, so that the angle of the optical axis of said transmitted light is changed.

3. The image displaying device according to claim 1, wherein said optical axis correcting means is comprised of a combination of a first transparent flat plate and a second transparent flat plate which have been so arranged as to rotate freely upon a first axis and a second axis which have a vertical relationship each other; and wherein the angle of the optical axis of said transmitted light is changed by rotating said first flat plate and the second flat plate upon said first axis and the second axis, respectively.

4. The image displaying device according to claim 1, wherein said optical axis correcting means is comprised of a prism which has been formed integrally by filling liquid into a gap between two plate-form materials.

5. The image displaying device according to claim 1, wherein said optical axis correcting means is comprised of an acousto-optic device which changes periodically the refractive index of the acousto-optic medium via a piezoelectric oscillator.

6. The image displaying device according to claim 1, wherein said detecting means for detecting the quantity of the displacement from the base position is comprised of a first detecting unit for detecting the quantity of displacement in the traveling direction of said movie film, and a second deleting unit for detecting the quantity of displacement in the width direction of said movie film.

* * * * *

UNITED STATES PATENT AND TRADEMARK OFFICE
CERTIFICATE OF CORRECTION

PATENT NO.: 5,608,474
DATED: March 4, 1997
INVENTOR(S): YOSHIO FUJIWARA ET AL.

It is certified that error appears in the above-identified patent and that said Letters Patent is hereby corrected as shown below:

At Col. 10, line 35, please replace "maimer" with --manner--.

At Col. 10, line 41, please replace "green" with --screen--.

At Col. 10, line 57, please replace "arc" with --are--.

At Col. 10, line 67, please insert --with-- after "relationship".

Signed and Sealed this

Eighteenth Day of August, 1998

Attest:

BRUCE LEHMAN

Attesting Officer

Commissioner of Patents and Trademarks